(12) United States Patent
Guilford et al.

(10) Patent No.: US 10,120,609 B2
(45) Date of Patent: Nov. 6, 2018

(54) TECHNOLOGIES FOR DETERMINISTIC CONSTANT-TIME DATA COMPRESSION

(71) Applicant: Intel Corporation, Santa Clara, CA (US)

(72) Inventors: James D. Guilford, Northborough, MA (US); Vinodh Gopal, Westborough, MA (US); Daniel F. Cutter, Maynard, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/720,920

(22) Filed: Sep. 29, 2017

(65) Prior Publication Data

US 2018/0152200 A1 May 31, 2018

Related U.S. Application Data

(60) Provisional application No. 62/427,268, filed on Nov. 29, 2016.

(51) Int. Cl.
*H03M 7/30* (2006.01)
*G06F 3/06* (2006.01)
(Continued)

(52) U.S. Cl.
CPC .......... *G06F 3/0641* (2013.01); *G06F 3/0604* (2013.01); *G06F 3/065* (2013.01); *G06F 3/067* (2013.01); *G06F 3/0608* (2013.01); *G06F 3/0611* (2013.01); *G06F 3/0613* (2013.01); *G06F 3/0617* (2013.01); *G06F 3/0647* (2013.01); *G06F 3/0653* (2013.01); *G06F 7/06* (2013.01); *G06F 8/654* (2018.02); *G06F 8/656* (2018.02); *G06F 8/658* (2018.02); *G06F 9/3851* (2013.01); *G06F 9/3891* (2013.01); *G06F 9/4401* (2013.01); *G06F 9/4881* (2013.01);
(Continued)

(58) Field of Classification Search
CPC ........ G06F 3/0641; G06F 21/57; G06F 21/73; G06F 3/0604; G06F 9/4401; G06F 8/654; G06T 9/005
USPC .............................................. 341/51, 87, 95
See application file for complete search history.

(56) References Cited

U.S. PATENT DOCUMENTS 9,003,054 B2 * 4/2015 Lee .......................... H04L 49/90
707/718
9,041,567 B2 * 5/2015 Jaquette ................... H03M 7/30
341/50

(Continued)

*Primary Examiner* — Brian Young
(74) *Attorney, Agent, or Firm* — Barnes & Thornburg LLP

(57) ABSTRACT

A compute device to generate deterministic compressed streams receives a current string to be matched to one or more prior instances of the current string, the current string being located within an input buffer and the one or more prior instances located within a history buffer. The compute device identifies a limited subset of index memory designated for storing pointers to the prior instances, identifying a reserved slop region in the index memory, and compares the current string to a prior instance, locating the at least one prior instance using at least one pointer to the at least one prior instance. The at least one pointer is stored within the limited subset of the index memory, and the compute device also prohibits use of any pointers stored in the reserved slop region of the index memory. Other embodiments are described and claimed.

25 Claims, 16 Drawing Sheets

(51) Int. Cl.

| | | |
|---|---|---|
| *G06F 17/30* | (2006.01) | |
| *H03M 7/40* | (2006.01) | |
| *H04L 12/26* | (2006.01) | |
| *H04L 12/813* | (2013.01) | |
| *H04L 12/851* | (2013.01) | |
| *G06F 11/07* | (2006.01) | |
| *G06F 11/30* | (2006.01) | |
| *G06F 11/34* | (2006.01) | |
| *G06F 7/06* | (2006.01) | |
| *G06T 9/00* | (2006.01) | |
| *H03M 7/42* | (2006.01) | |
| *H04L 12/28* | (2006.01) | |
| *H04L 12/46* | (2006.01) | |
| *H04L 29/12* | (2006.01) | |
| *G06F 13/16* | (2006.01) | |
| *G06F 21/62* | (2013.01) | |
| *G06F 21/76* | (2013.01) | |
| *H03K 19/173* | (2006.01) | |
| *H04L 9/08* | (2006.01) | |
| *H04L 12/933* | (2013.01) | |
| *H04L 29/08* | (2006.01) | |
| *G06F 9/38* | (2018.01) | |
| *G06F 9/48* | (2006.01) | |
| *G06F 9/50* | (2006.01) | |
| *G06F 12/06* | (2006.01) | |
| *G06T 1/20* | (2006.01) | |
| *G06T 1/60* | (2006.01) | |
| *G06F 9/54* | (2006.01) | |
| *G06F 8/656* | (2018.01) | |
| *G06F 8/658* | (2018.01) | |
| *G06F 8/654* | (2018.01) | |
| *G06F 9/4401* | (2018.01) | |
| *H01R 13/453* | (2006.01) | |
| *H01R 13/631* | (2006.01) | |
| *H05K 7/14* | (2006.01) | |
| *G06F 21/57* | (2013.01) | |
| *G06F 21/73* | (2013.01) | |
| *G06F 11/14* | (2006.01) | |
| *G06F 12/02* | (2006.01) | |
| *H04L 12/24* | (2006.01) | |
| *H04L 29/06* | (2006.01) | |
| *G06F 15/80* | (2006.01) | |

(52) U.S. Cl.
CPC ............ *G06F 9/505* (2013.01); *G06F 9/5038* (2013.01); *G06F 9/544* (2013.01); *G06F 11/079* (2013.01); *G06F 11/0709* (2013.01); *G06F 11/0751* (2013.01); *G06F 11/3006* (2013.01); *G06F 11/3034* (2013.01); *G06F 11/3055* (2013.01); *G06F 11/3409* (2013.01); *G06F 12/0284* (2013.01); *G06F 12/0692* (2013.01); *G06F 13/1652* (2013.01); *G06F 17/30153* (2013.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/2007* (2013.01); *H04L 67/1014* (2013.01); *H04L 67/327* (2013.01); *H04L 67/36* (2013.01); *H05K 7/1452* (2013.01); *H05K 7/1487* (2013.01); *G06F 11/1453* (2013.01); *G06F 12/023* (2013.01); *G06F 15/80* (2013.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 63/1425* (2013.01)

(56) References Cited

U.S. PATENT DOCUMENTS 9,335,950 B2 * 5/2016 Horn .................... G06F 3/0656
9,549,196 B2 * 1/2017 Wu ........................ H04N 19/46

* cited by examiner

TECHNOLOGIES FOR DETERMINISTIC CONSTANT-TIME DATA COMPRESSION

CROSS-REFERENCE TO RELATED APPLICATIONS

The present application claims the benefit of U.S. Provisional Patent Application No. 62/427,268, filed Nov. 29, 2016 and Indian Provisional Patent Application No. 201741030632, filed Aug. 30, 2017.

BACKGROUND

Data compression is an important computer operation used in many computing applications, including both server and client applications. For example, data compression may be used to reduce network bandwidth requirements and/or storage requirements for cloud computing applications. Many common lossless compression formats are based on the LZ77 compression algorithm. Typically high-performance compression hardware will contain a number of at least partially asynchronous machines. The timing of one of these machines with respect to a different machine may change slightly, resulting in slightly different output. Software, such as the abovementioned compression formats, may be unaware of these underlying micro-architectural details in the hardware. As a result, many compression formats result in non-deterministic outputs. In other words, for a given input, many different valid compressed outputs may result, each of which can be decompressed to the original input.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
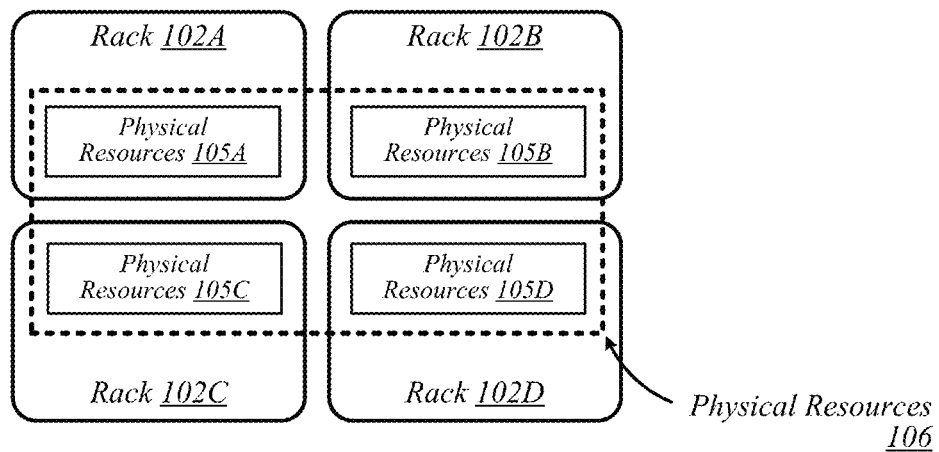
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual inline memory modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, application-specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
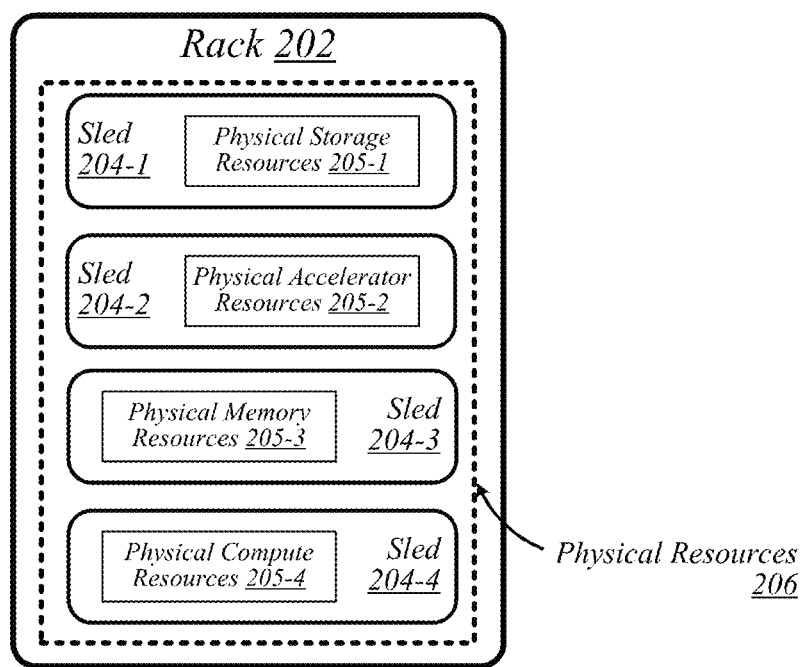
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
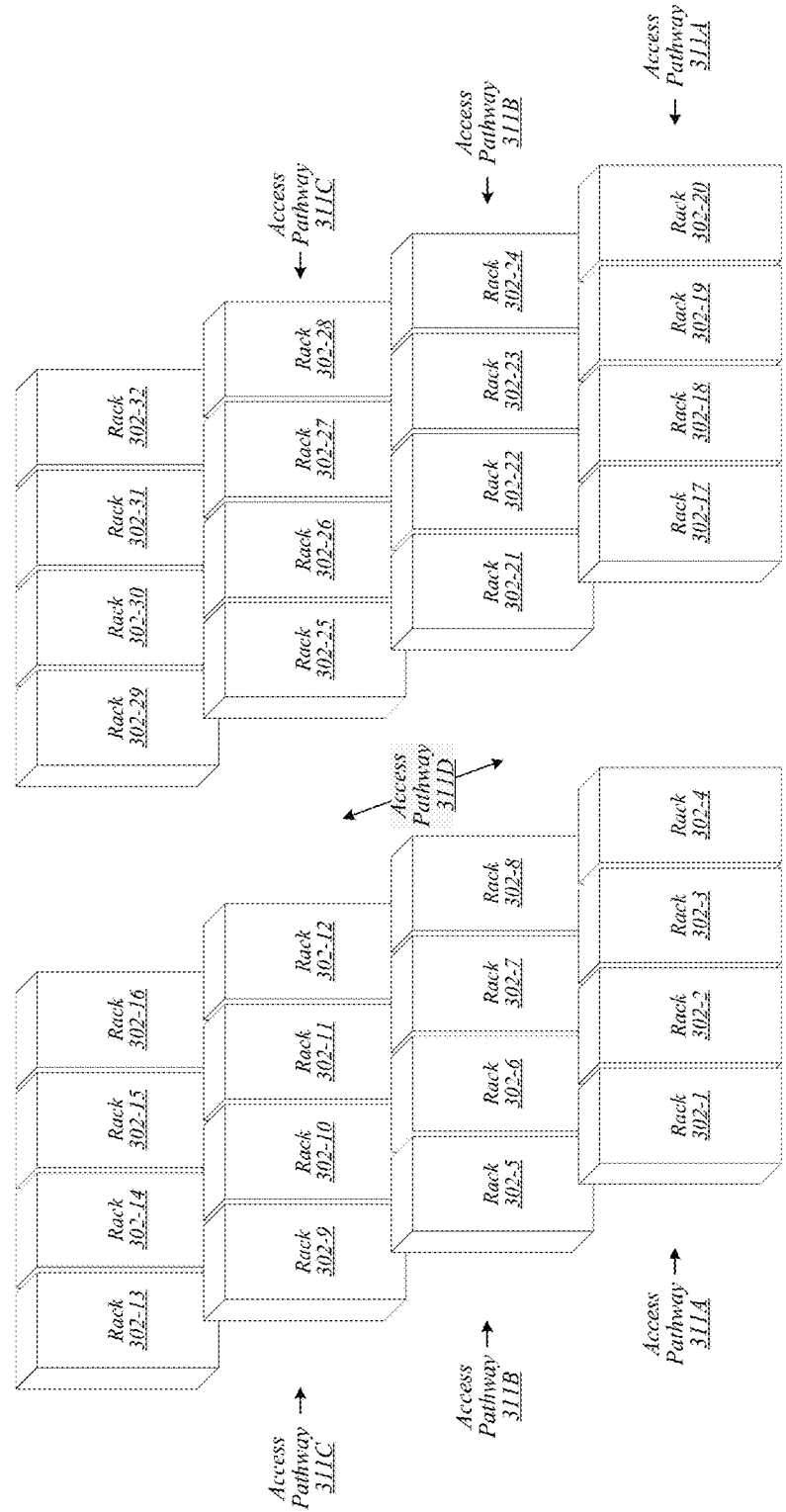
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
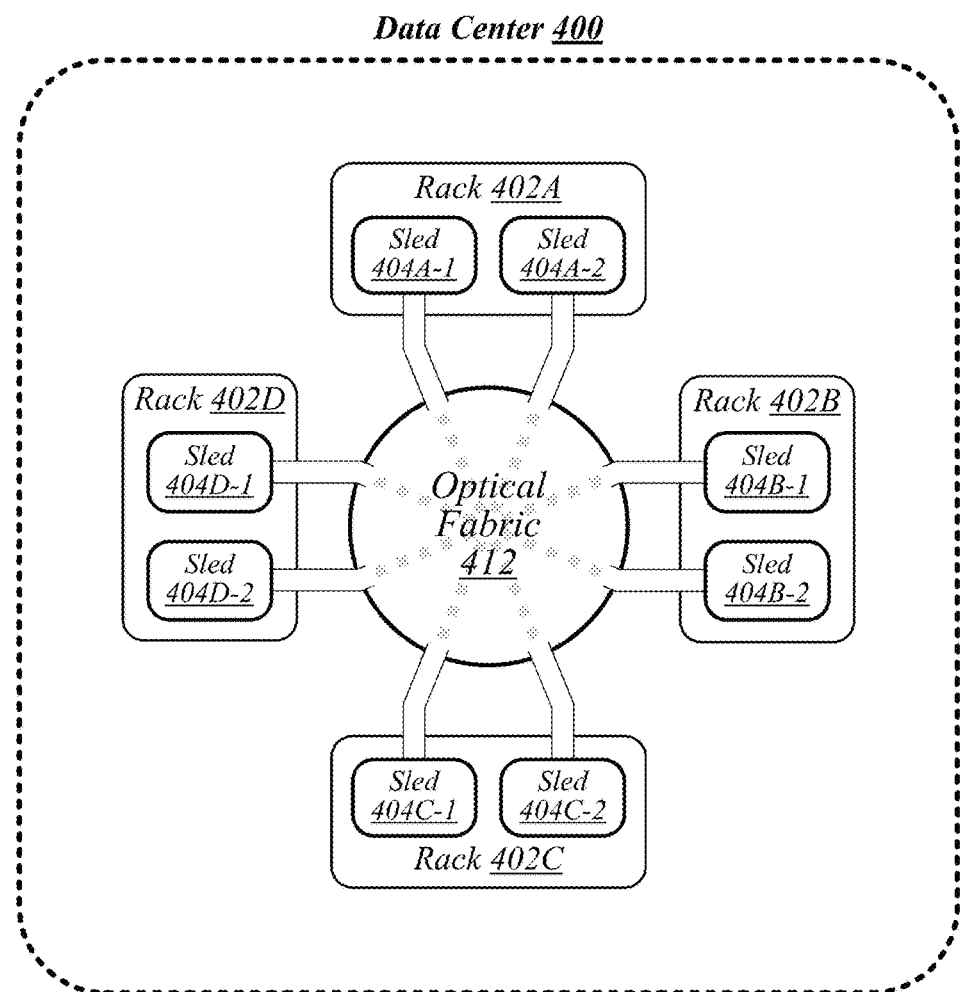
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
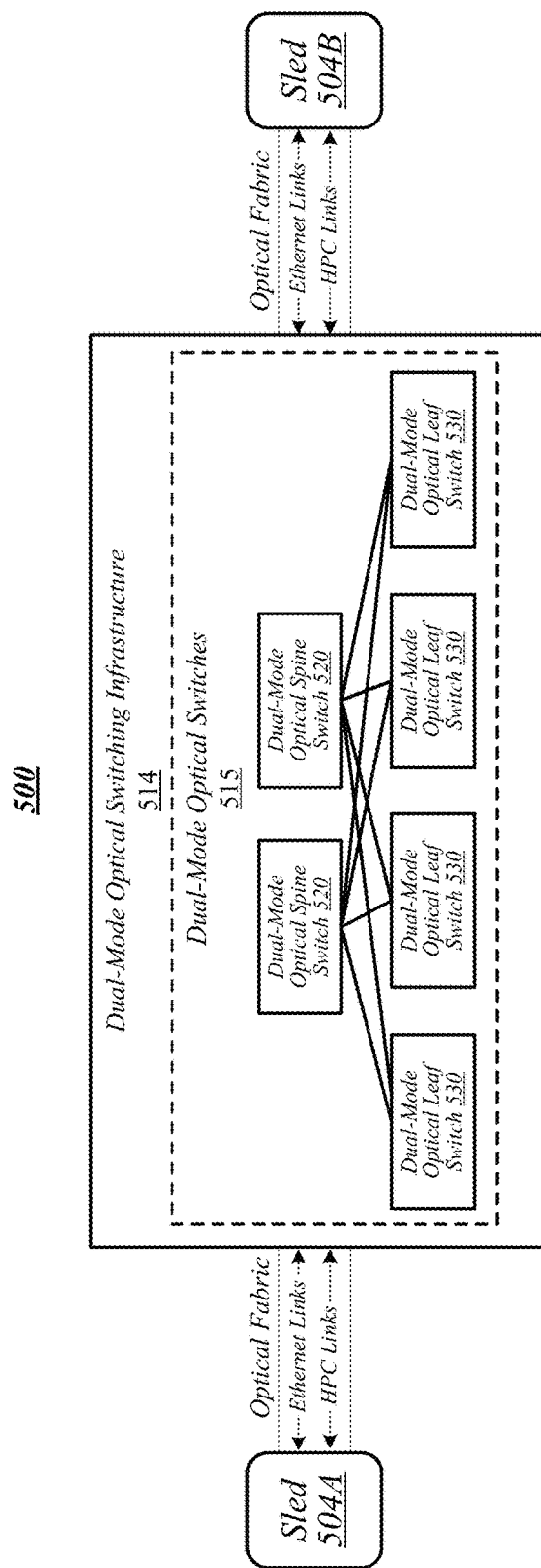
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
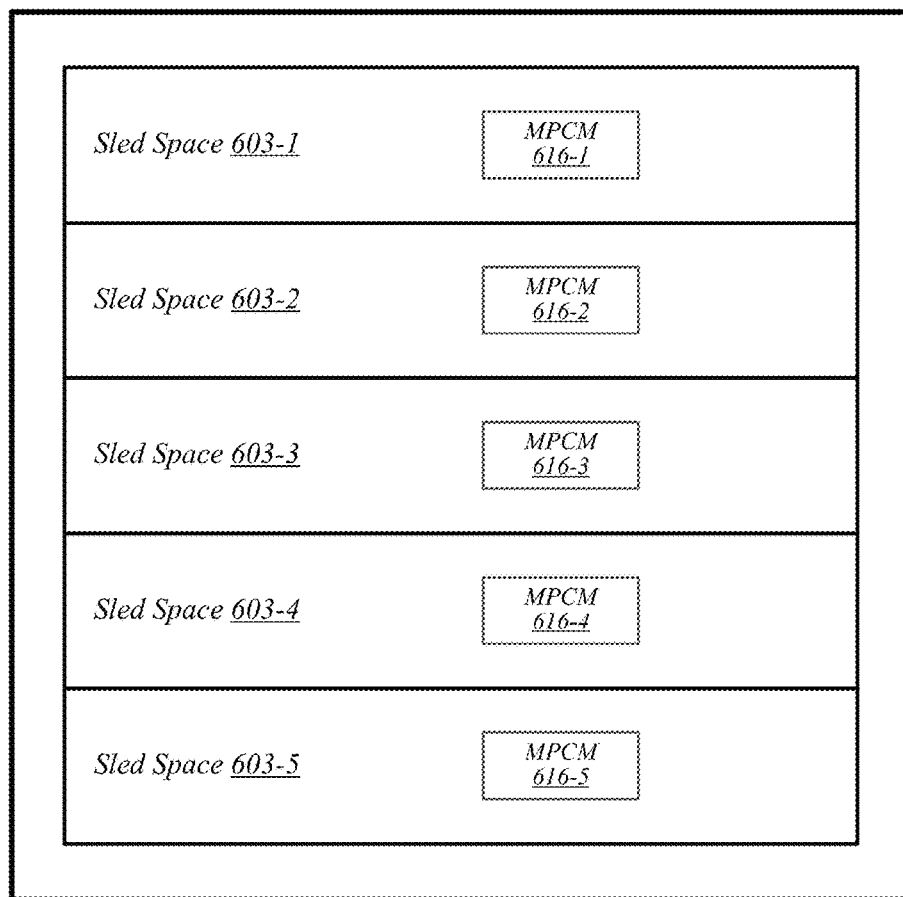
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
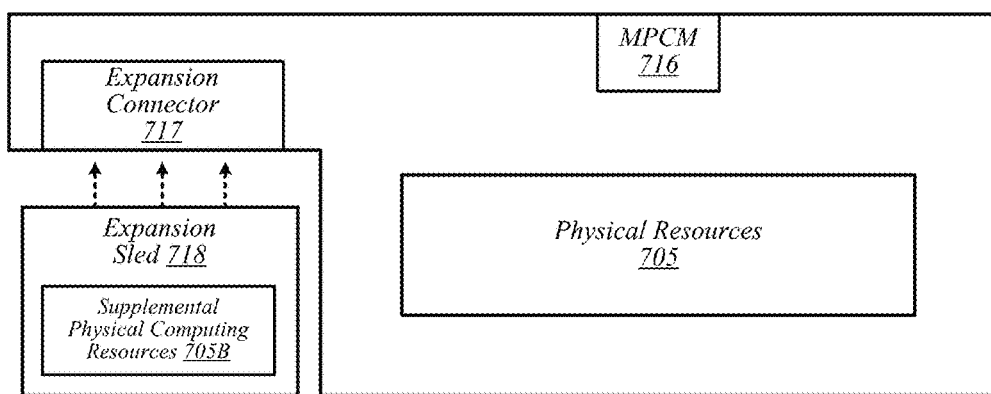
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
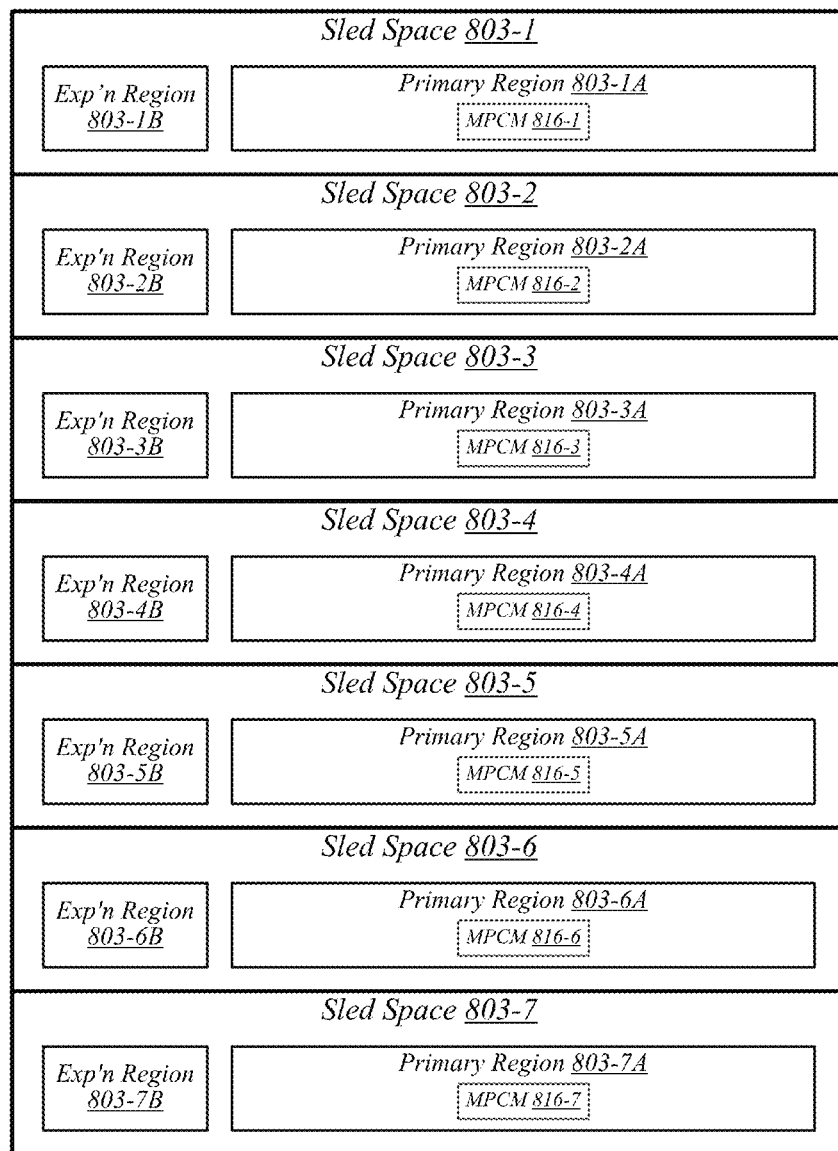
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
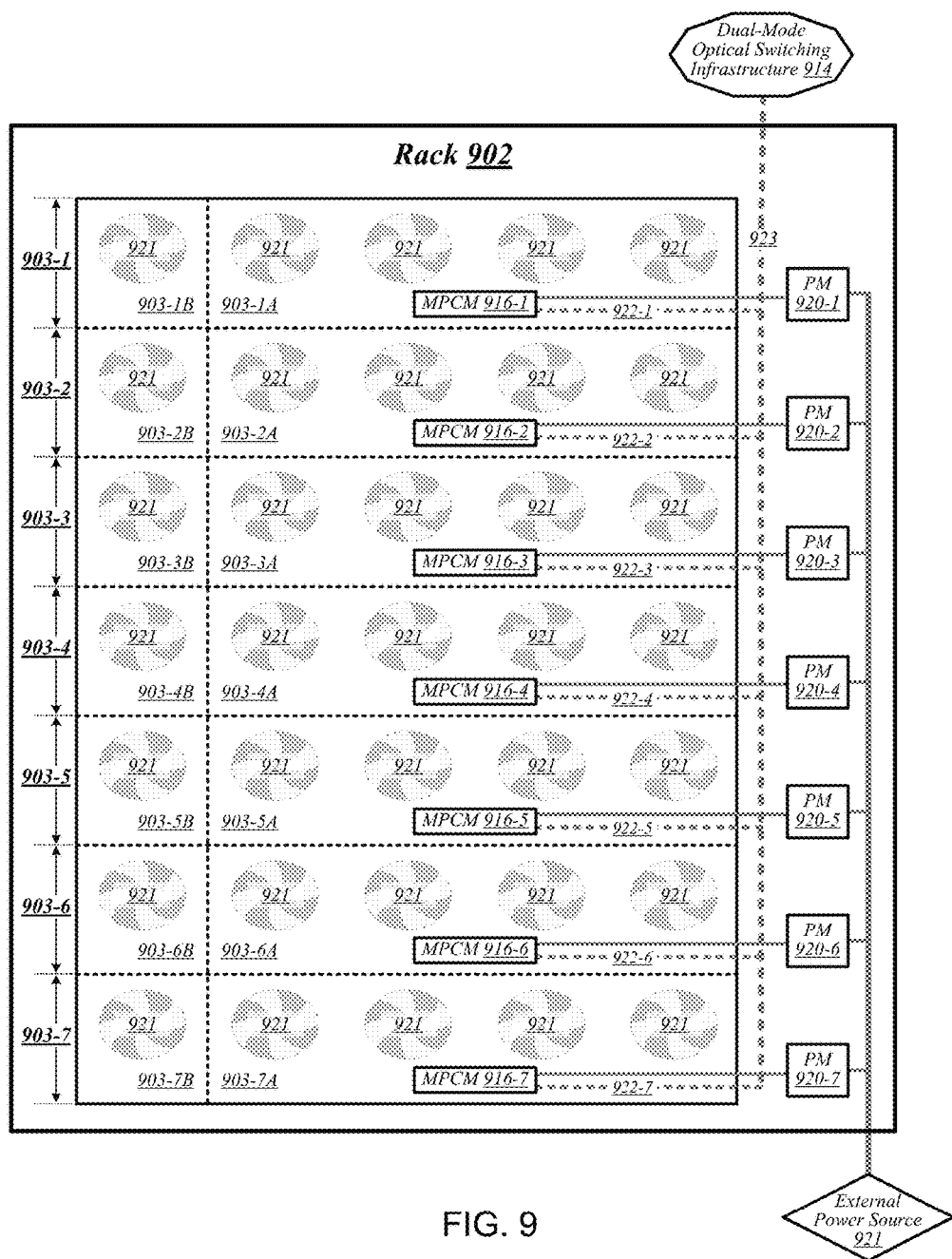
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1 U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
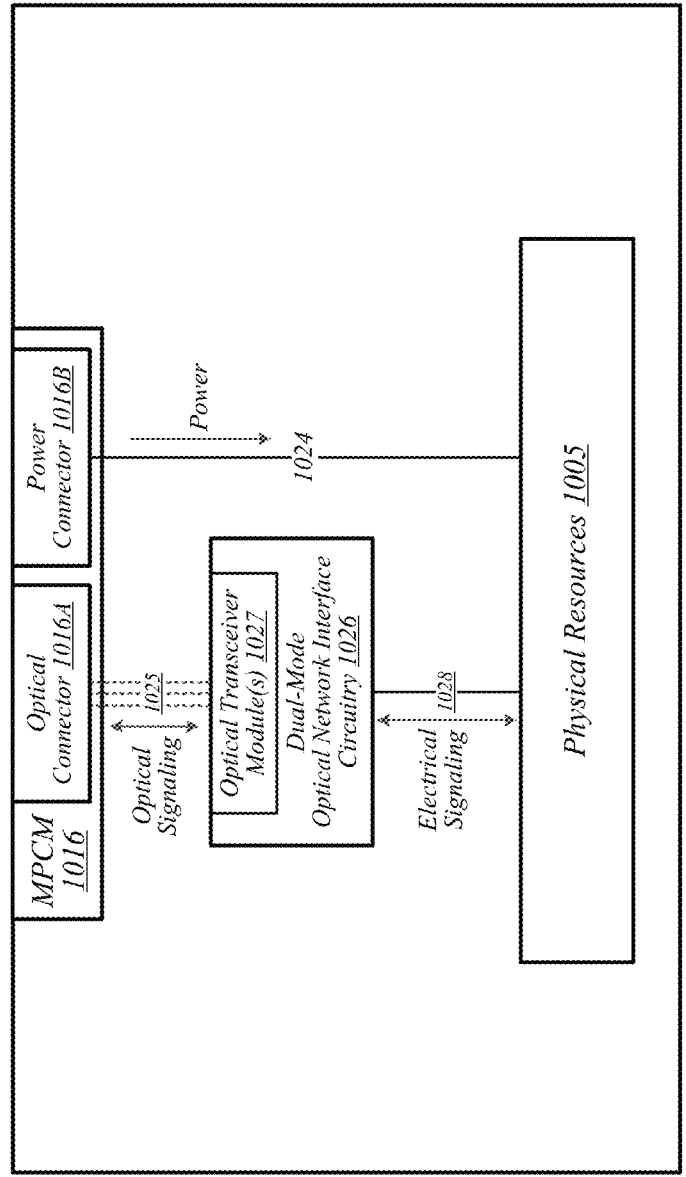
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
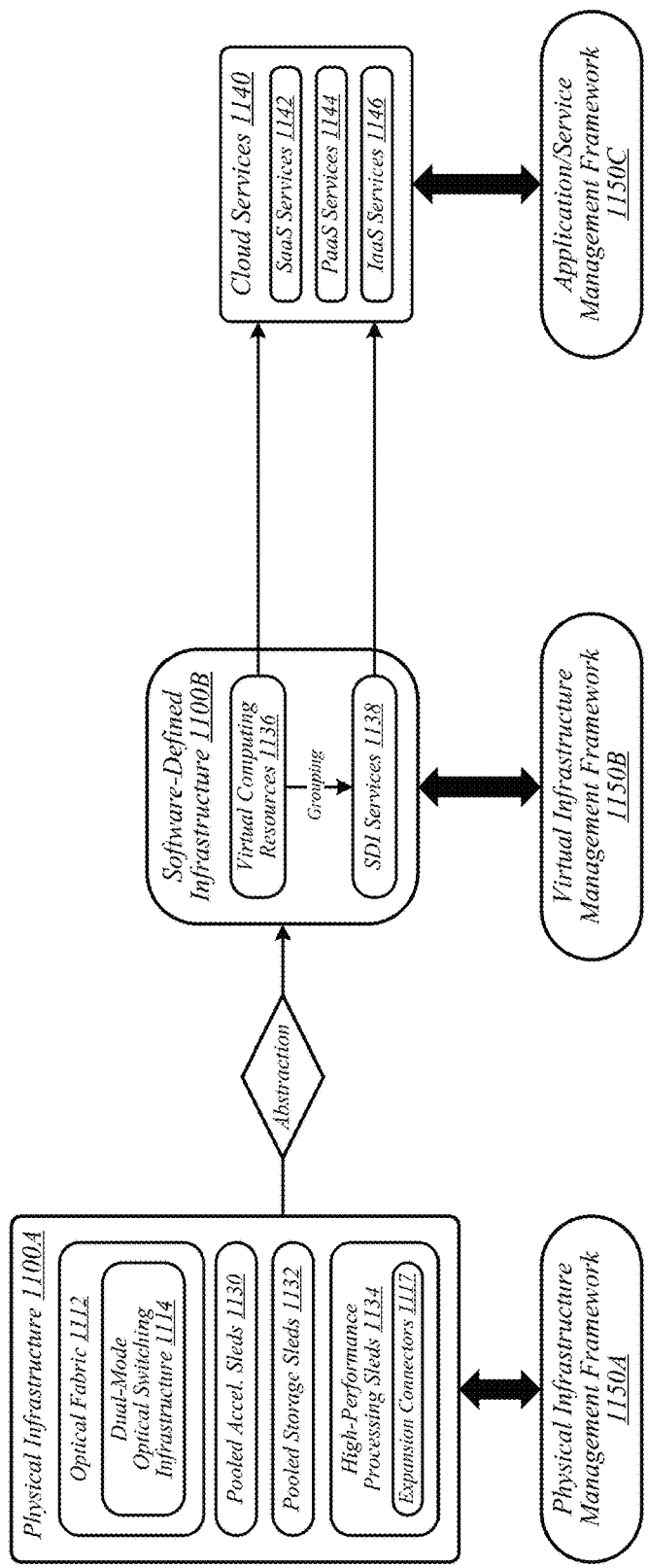
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide quality of service (QoS) management capabilities for cloud services 1140. The embodiments are not limited in this context.

Figure 12:
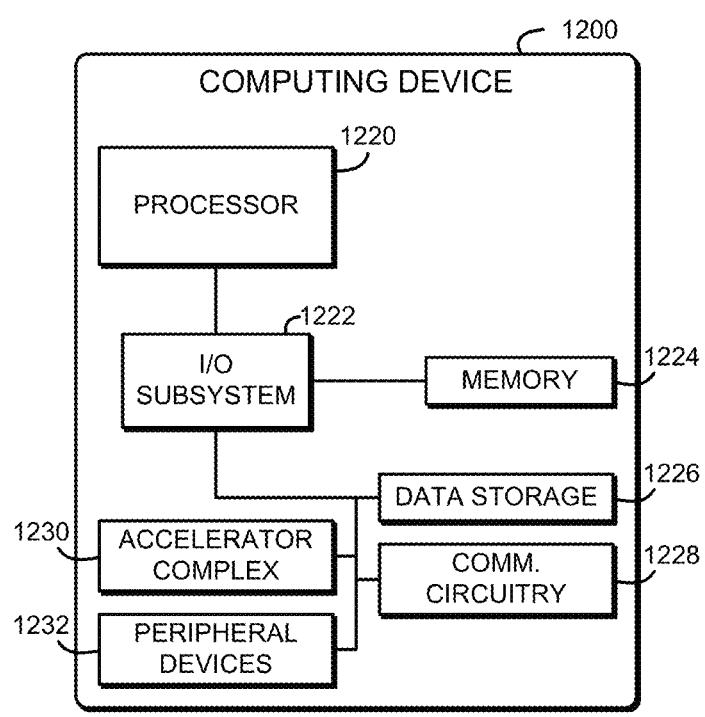
FIG. 12 is a simplified block diagram of at least one embodiment of a computing device for deterministic compression.

Referring now to FIG. 12, an illustrative computing device 1200 for deterministic compression includes a processor 1220, an input/output (I/O) subsystem 1222, a memory 1224, a data storage device 1226, and an accelerator complex 1230. The computing device 1200 may be embodied as server computer, a rack server, a blade server, a compute node, and/or a sled in a data center, such as a sled 204 as described above in connection with FIG. 2, a sled of the physical infrastructure 1100A as described above in connection with FIG. 11, or another sled of the data center.

In use, as described below, the computing device 1200 offloads compression of a data block, data stream, or other uncompressed data to the accelerator complex 1230. The accelerator complex 1230 compresses the data block with a lossless compression algorithm such as DEFLATE, using high-performance parallel hardware resources. In particular, the accelerator complex 1230 may include a table updater and multiple compare engines. The table updater indexes input data by writing pointers to an index memory, and the compare engines walk chains of pointers from the index memory to identify matches in the input history. To avoid stalls, the table updater may index the input past the current position used by the compare engines, up to a pre-advance limit. The compare engines may identify a slop region in the index memory that could be overwritten by the table updater (e.g., a slop region large enough to store a pointer for every position in the pre-advance limit). The compare engines do not perform matches using pointers in the slop region. Additionally, the compare engines retire matches in a natural order, which may be based on the input byte order and/or heuristic matching rules. Thus, the matches (and therefore output) generated by the accelerator complex 1230 does not depend on timing variations between the table updater and the compare engines and/or between multiple comparisons performed by the compare engine. Accordingly, the accelerator complex 1230 may generate deterministic output data; that is, the compressed output data depends only on the input data and the level of compression selected, and not any random timing variations or other unpredictable variations. Generating deterministic output may allow the accelerator complex 1230 to be accurately modeled in software. Additionally, deterministic output may make validation of the hardware design of the accelerator complex 1230 easier or otherwise improve hardware validation.

The processor 1220 may be embodied as any type of processor capable of performing the functions described herein. For example, the processor 1220 may be embodied as a single or multi-core processor(s), digital signal processor, microcontroller, or other processor or processing/controlling circuit. Similarly, the memory 1224 may be embodied as any type of volatile or non-volatile memory or data storage capable of performing the functions described herein. In operation, the memory 1224 may store various data and software used during operation of the computing device 1200 such operating systems, applications, programs, libraries, and drivers. The memory 1224 is communicatively coupled to the processor 1220 via the I/O subsystem 1222, which may be embodied as circuitry and/or components to facilitate input/output operations with the processor 1220, the memory 1224, and other components of the computing device 1200. For example, the I/O subsystem 1222 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 1222 may form a portion of a system-on-a-chip (SoC) and be incorporated, along with the processor 1220, the memory 1224, and other components of the computing device 1200, on a single integrated circuit chip.

The data storage device 1226 may be embodied as any type of device or devices configured for short-term or long-term storage of data such as, for example, memory devices and circuits, memory cards, hard disk drives, solid-state drives, non-volatile flash memory, or other data storage devices. The computing device 1200 may also include a communications subsystem 1228, which may be embodied as any communication circuit, device, or collection thereof, capable of enabling communications between the computing device 1200 and other remote devices over a computer network (not shown). The communications subsystem 1228 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication.

The accelerator complex 1230 may be embodied as any coprocessor, application-specific integrated circuit (ASIC), field-programmable gate array (FPGA), functional block, IP core, or other hardware accelerator of the computing device 1200 capable of compressing data and otherwise performing the functions described herein. The accelerator complex 1230 may communicate uncompressed input data and compressed output data by performing one or more direct memory access (DMA) operations to the memory 1224 or by otherwise communicating with the processor 1220. Additionally or alternatively, although illustrated as a separate component, it should be understood that in some embodiments the accelerator complex 1230 may be integrated with or otherwise form a portion of one or more other components of the computing device 1200, such as the processor 1220 and/or the I/O subsystem 1222.

The computing device 1200 may further include one or more peripheral devices 1232. The peripheral devices 1232 may include any number of additional input/output devices, interface devices, hardware accelerators, and/or other peripheral devices. For example, in some embodiments, the peripheral devices 1232 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 13:
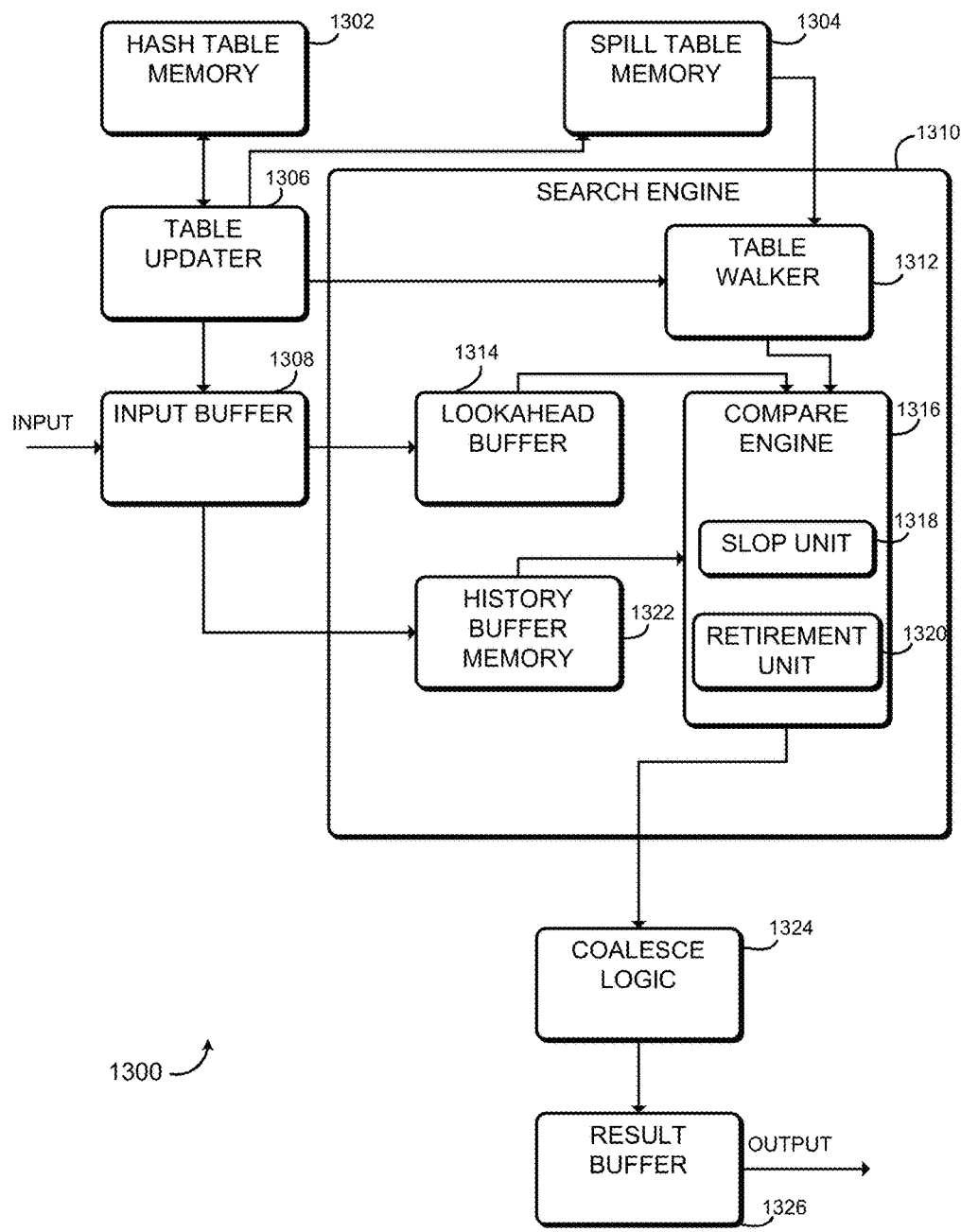
FIG. 13 is a simplified block diagram of at least one embodiment of an accelerator complex of the computing device of FIG. 12.

Referring now to FIG. 13, diagram 1300 shows an illustrative embodiment of the deterministic compression environment as described herein. As shown, the environment 1300 includes the accelerator complex 1230 that includes a search engine 1310 in communication with various other components, including a hash table memory 1302, a spill table memory 1304, a table updater 1306, an input buffer 1308, a coalesce logic 1324, and a result buffer 1326 in communication with the coalesce logic 1324. The search engine 1310 includes a lookahead buffer 1314, a table walker 1312, a compare engine 1316, and a history buffer memory 1322. The various components of the accelerator complex 1230 may be embodied as hardware, firmware, embedded software, or a combination thereof. As such, in some embodiments, the various components of the accelerator complex 1230 may be embodied as logic blocks, memory blocks, digital logic components, logic gates, circuitry, or other collection of electrical devices. Additionally, in some embodiments, one or more of the illustrative components may form a portion of another component and/or one or more of the illustrative components may be independent of one another.

The input buffer 1308 is coupled to the table walker 1312, which is coupled to the hash table memory 1302. The input buffer 1308 is also coupled to the history buffer memory 1322, which is coupled to the compare engine 1316. The input buffer 1308 may be embodied as any memory device, such as an on-die SRAM device. The input buffer 1308 stores uncompressed input data, which may retrieved from the memory 1224 using one or more DMA operations, provided by the processor 1220 to the accelerator complex 1230, or otherwise accessed by the accelerator complex 1230. The input buffer 1308 may store the uncompressed input data at a current input position, which may be a current byte offset in an input data stream or other location in the input data. The input buffer 1308 may also include and/or be coupled to one or more lookahead buffers 1314, which store uncompressed input data beyond the current input position. The lookahead buffers may be used by the compare engine 1316 to identify matches in the input history that match strings in the uncompressed input data, up to a maximum potential match length. The history buffer memory 1322 may be embodied as any memory device, such as an on-die SRAM device. The history buffer memory 1322 may store a copy of the uncompressed input data received from the input buffer 1308, and the history buffer memory 1322 has a fixed storage capacity (i.e., size).

The hash table memory 1302 and the spill table memory 1304 are configured to index the uncompressed data stored at each location in the input history. Thus, in some embodiments, the hash table memory 1302 and the spill table memory 1304 may be embodied as or otherwise considered a single index memory. The hash table memory 1302 and/or the spill table memory 1304 may be indexed with the hash of a string of uncompressed input data and may store the location in the input history of that uncompressed input data. The spill table memory 1304 may store overflow entries from the hash table memory 1302. The table walker 1312 may be used to retrieve locations in the input history from the hash tables and/or spill tables. In particular, the table walker 1312 may follow hash chains in the hash table memory 1302 and/or the spill table memory 1304, and the table updater may update the hash tables and/or spill tables with new uncompressed input data read into the input buffer 1308.

The table updater 1306 is configured to index the input buffer 1308 at positions from a current input string up to a pre-advance limit. The table updater 1306 is configured to generate a hash of an n-byte string at a particular position p (from the current input string position up to the pre-advance limit). The table updater 1306 is configured to look up a hash table entry in the hash table memory 1302 using the hash. That hash table entry may hold one or more pointers to prior instances of the n-byte string in the input history. The table updater 1306 is further configured to determine whether the hash table entry is full and if so, to write the hash table entry to the spill table memory 1304. The table updater 1306 may overwrite the oldest spill table entry in the spill table memory 1304 when writing the hash table entry.

The compare engine 1316 is configured to receive a current string to be matched to one or more prior instances of the current string. The current string is located within the input buffer 1308 at a current position, and the one or more prior instances are located within the history buffer 1322. The compare engine 1316 is configured to identify a limited subset of the index memory (e.g., the hash table memory 1302 and/or the spill table memory 1304) designated for storing pointers to the one or more prior instances. Identifying the limited subset includes identifying a reserved slop region in the index memory. The reserved slop region has a length determined as a function of to the pre-advance limit of the table updater 1306. For example, the length of the reserved slop region may include one pointer for each position of the pre-advance limit. The compare engine 1316 is further configured to compare the current string to at least one prior instance. Comparing the current string includes locating the prior instance using a pointer to the prior instance. The pointer is stored within the limited subset of the index memory. Comparing the current string further includes prohibiting the use of any pointers stored in the reserved slop region of the index memory. Comparing the current string may include traversing the index memory in an order that is a reverse of an initialization order and stopping the traverse in response to entering the reserved slop region.

The compare engine 1316 may be further configured to compare multiple prior instances and retire the comparisons in a natural order. The natural order may be determined as a function of an input byte order and/or one or more heuristic matching rules. In some embodiments, those features may be performed by one or more sub-components of the compare engine 1316, such as a slop unit 1318 and/or a retirement unit 1320. Additionally, it should be understood that the search engine 1310 may include multiple compare engines 1316 or otherwise perform multiple comparisons in parallel.

Additionally, although illustrated as including a single search engine 1310, it should be understood that the accelerator complex 1230 may include multiple search engines 1310, and that each search engine 1310 may operate on a different input position in parallel. For example, one search engine 1310 may operate on position i in the input, another search engine 1310 may operate on position i+1, and so on. Each of the search engines 1310 is coupled to the coalesce logic 1324, which is configured to merge the matches output by the search engines 1310 to generate compressed output data. The coalesce logic 1324 may, for example, select one or more matches from the search engines 1310, combine or truncate one or more matches, select one or more literals, or otherwise combine the matches into a single output token stream. The coalesce logic 1324 may output a stream of tokens including matches and literals, and/or may Huffman encode or otherwise generate compressed output data based on the stream of tokens. The compressed output data may be stored to the memory 1224 using one or more DMA operations, provided to the processor 1220, or otherwise output by the accelerator complex 1230.

Figure 14:
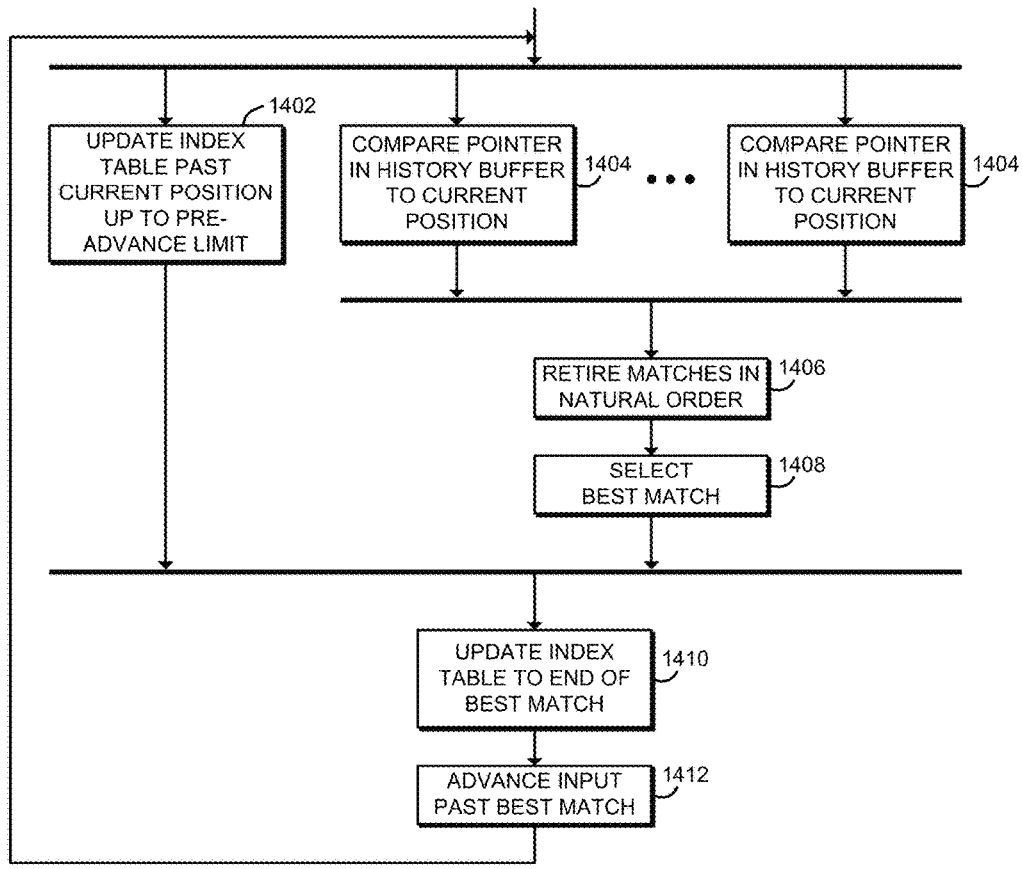
FIG. 14 is a simplified flow diagram of at least one embodiment of a method for deterministic compression that may be executed by the accelerator complex of the computing device of FIGS. 12-13.

Referring now to FIG. 14, in use, the computing device 1200 may execute a method 1400 for deterministic compression. More specifically, FIG. 14 gives an overview of the functions of the accelerator complex 1230, and illustrates how the table updater 1306 works in parallel with multiple compare engines 1316. It should be appreciated that, in some embodiments, the operations of the method 1400 may be performed by one or more components of the accelerator complex 1230 of the computing device 1200 as shown in FIG. 13. The method 1400 begins in block 1402, in which the table updater 1306 of the computing device 1200 updates the index table past the current position in the input data up to a pre-advance limit. The pre-advance limit refers to the maximum distance past the current position that the table updater 1306 can index, further described below in connection with FIG. 16. The size of the pre-advance limit also determines the size of the predetermined slop region, which is described further below with respect to FIG. 15.

As shown in FIG. 14, multiple instances of a block 1404 may execute concurrently with the block 1402. In each block 1404, the computing device 1200 compares one or more pointers in the history buffer memory 1322 to the current input position in the input buffer 1308. For example, a hash of a predetermined length of uncompressed input data starting at the current input position may be used to index a hash table in order to retrieve the list of potential matches. Each potential match may be identified with a position in the input history (e.g., a backward distance from the current input position). The compare engine 1316 compares the input history data at the location of the potential match with the uncompressed input data at the current position. The compare engine 1316 may use a lookahead buffer to identify matching data beyond the current position in the uncompressed input data. For each match that is found, the compare engine 1316 identifies a length of the match (e.g., a number of bytes consecutive bytes that match) and a backward distance of the match (e.g., a negative offset in bytes from the current input position to the start of the match in the input history). Multiple compare engines 1316 may operate in parallel on different pointers into the history buffer memory 1322.

In block 1406, the computing device 1200 retires matches from the compare engines 1316 in the natural order. The natural order may be embodied as the input byte order as received from the input buffer. In block 1408, the computing device 1200 selects a best match based on the natural order of matches. The compare engine 1316 may use any appropriate heuristic or other scoring algorithm to select the best match. For example, in some embodiments the compare engine 1316 may select the match with the largest length. As another example, the compare engine 1316 may select the first match in the natural order having a length above a predetermined threshold, such as the match with the smallest distance having a length above the threshold. Because the compare engine 1316 retires the matches in natural order and selects the best match in natural order, the best match is deterministically selected and is not dependent on timing variations (i.e., not dependent on which compare operation completes first). After selection, the best match may be output to the coalesce logic 1324, which may coalesce and/or merge the matches generated by multiple search engines 1310. The coalesce logic 1324 may output a stream of tokens that identify matches and literals, which may also be Huffman encoded. The output stream is provided to the result buffer 1326, and may be output to the memory 1224 and/or the processor 1220.

In block 1410, the computing device 1200 updates the history buffer memory 1322 to a new position. The computing device 1200, for example, may use a table updater to update one or more hash tables, spill tables, or other index data structures of the history buffer memory 1322 based on the contents of the uncompressed input data. The new input position may be advanced past the end of the last match or literal token output by the coalesce logic 1324. In block 1412, the computing device 1200 updates the history buffer memory 1322 to the new input location. For example, the computing device 1200 may copy data from the input buffer 1308 to the history buffer memory 1322. After updating the history buffer memory 1322, the method 1400 loops back to block 1404 to continue searching in parallel for matches starting at the updated input position.

Figure 15:
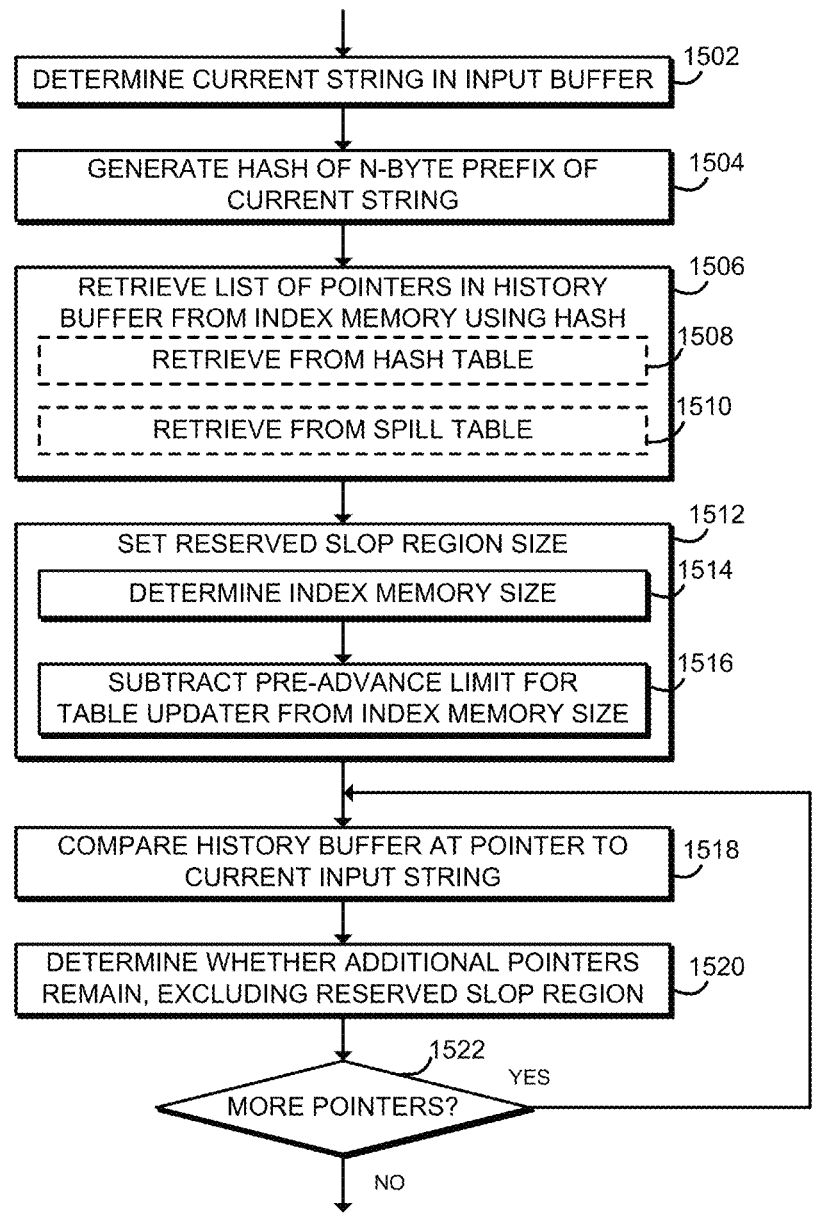
FIG. 15 is a simplified flow diagram of at least one embodiment of a method for a deterministic compression that may be executed by the accelerator complex of the computing device of FIGS. 12-13.

Referring now to FIG. 15, in use, the computing device 1200 may execute a method 1500 for deterministic compression. It should be appreciated that, in some embodiments, the operations of the method 1500 may be performed by one or more components of the accelerator complex 1230 of the computing device 1200 as shown in FIG. 13, such as a compare engine 1316.

The method 1500 begins in block 1502, in which the computing device 1200 determines the current string in the input buffer 1308. The current string is located at a current position in the input buffer 1308, which may be assigned to or otherwise determined by the search engine 1310. In block 1504, the computing device 1200 generates a hash of an n-byte prefix of the current string. For example, the computing device 1200 may generate a hash of a three-byte prefix of the current string. In block 1506, the computing device 1200 retrieves a list of pointers in history buffer memory 1322 using the hash generated in block 1504. More specifically, and as illustrated in block 1508, the computing device 1200 may retrieve pointers from the hash table memory 1302 using the generated hash. As illustrated in block 1510, the computing device 1200 may also retrieve pointers from the spill table memory 1304. As these hash chains can get arbitrarily long, there is spill table memory 1304 that may, for example, maintain a linked list of all possible locations whose prefixes hash to the same value. Initially all pointers of all the hash table entries are reset to a null or an invalid state and a 'spill valid' bit is reset to 0. For each update to a hash table entry the pointers are shifted one position and the new byte position is used as the pointer 0 value. When the hash table entry can no longer accommodate additional pointers, the next incoming pointer is written to the spill table memory 1304.

In block 1512, the computing device 1200 sets a reserved slop region size. For example, the index memory (e.g., the hash table memory 1302 and the spill table memory 1304 combined) may contain space for 8192 pointers. Ordinarily, this would mean that the compare engine 1316 could follow pointers back through the hash chains until it would go more than 8192 pointers back, at which point it would have to stop following the pointers. However, and as in the illustrative embodiment, a slop region of, for example, 192 positions can be set. Accordingly, the compare engine 1316 can then go back through the history buffer memory 1322 up to 8000 pointers back, at which point it stops, regardless of whether there were valid pointers (not yet overwritten) in the remaining (up to) 192 pointers. The slop region size corresponds to the pre-advance limit of the table updater 1306. Accordingly, in block 1514, the computing device 1200 determines the index memory size (e.g., 8192 pointers). In block 1516, the computing device 1200 subtracts the number of pointers corresponding to the pre-advance limit (e.g., 192 pointers) for the table updater 1306 from the index memory size (8192 pointers) in order to arrive at the number of pointers that may be searched in the exemplary embodiment (e.g., 8000 pointers).

In block 1518, the computing device 1200 compares the history buffer memory 1322 at the current pointer to the current input string received from input buffer 1308. In block 1520, the computing device 1200 determines whether additional pointers remain, excluding the reserved slop region. For example, the table walker 1312 may follow hash chains in the hash table memory 1302 and/or spill table memory 1304 until the pointers reach the slop region. In block 1522, if more pointers remain, the method 1500 loops back to block 1518 to again compare the history buffer memory 1322 at the current pointer to the current input string. If no additional pointers remain, the method 1500 is completed. As described above in connection with FIG. 14, any matches found by the compare engine 1316 may be retired in natural order.

Figure 16:
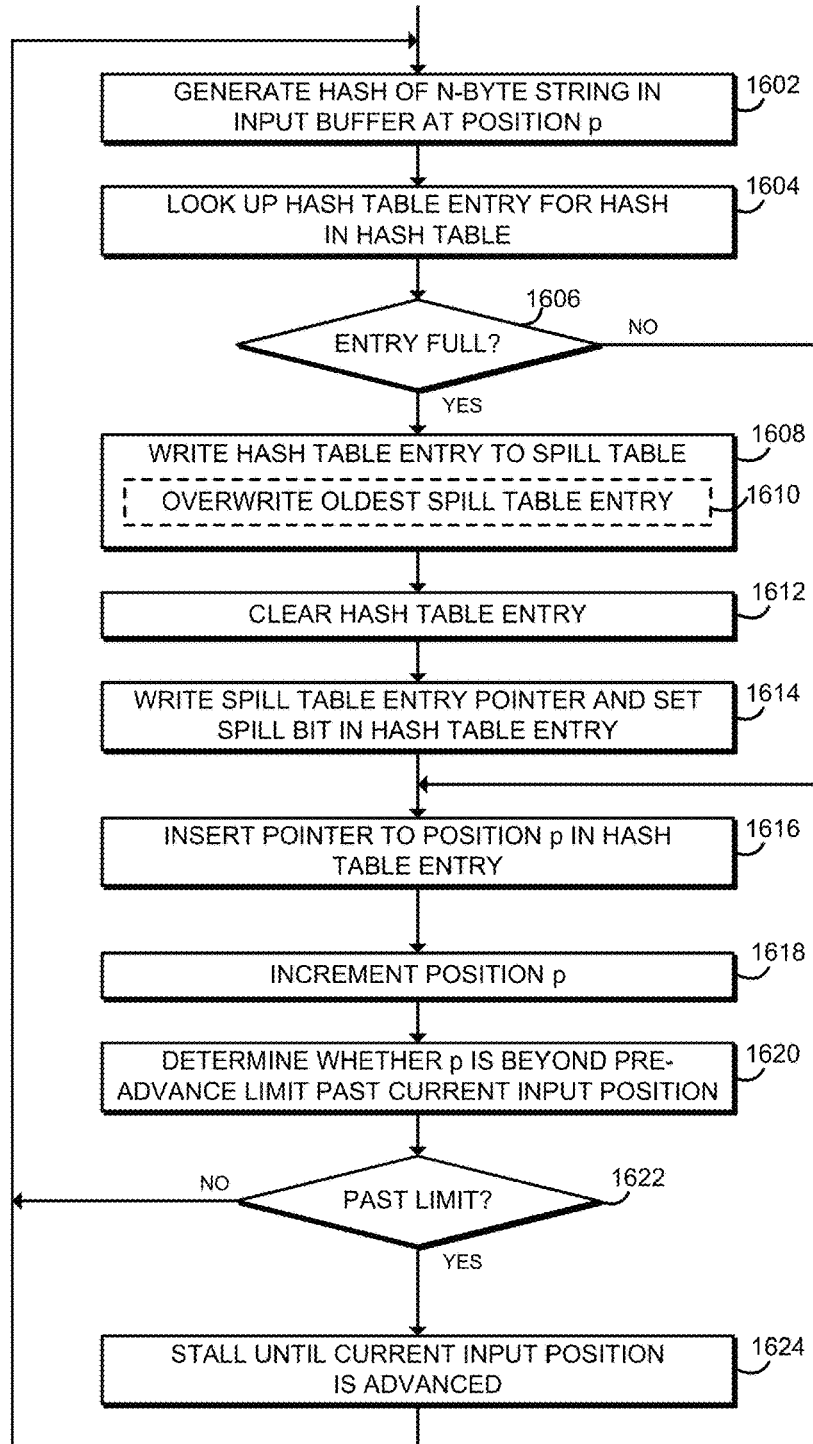
FIG. 16 is a simplified flow diagram of at least one embodiment of a method for a deterministic compression that may be executed by the accelerator complex of the computing device of FIGS. 12-13.

Referring now to FIG. 16, in use, the computing device 1200 may execute a method 1600 for deterministic compression. It should be appreciated that, in some embodiments, the operations of the method 1600 may be performed by one or more components of the accelerator complex 1230 of the computing device 1200 as shown in FIG. 13, such as the table updater 1306. The method 1600 begins in block 1602, where the computing device 1200 generates a hash of an n-byte string in the input buffer at, for example, a position p. The n-byte string may have the same width as the n-byte prefix generated by the compare engine 1316, as described above in connection with block 1504 of FIG. 15. For example, the computing device 1200 may generate a hash of a 3-byte string in the input buffer at position p. The position p may be beyond the current input position being searched by the compare engine 1316 as described above in connection with FIG. 15. In block 1604, the computing device 1200 looks up a hash table entry for the hash in the hash table memory 1302. In block 1606, the computing device 1200 determines whether the hash table entry is full (i.e., wherein there is no capacity to store additional pointers in the hash table entry).

If the hash table entry is full, the method advances to block 1608, in which the computing device 1200 writes the hash table entry to the spill table memory 1304. As part of writing the hash table entry to the spill table memory 1304, in block 1610, the computing device 1200 may overwrite the oldest spill table entry in the spill table memory 1304. For example, the spill table memory 1304 may be embodied as a fixed-sized circular buffer, and new entries may overwrite the oldest entries. In block 1612, the computing device 1200 clears the hash table entry. For example, all offset pointers of the hash table entry may be written to a null or invalid state. In block 1614, the computing device 1200 writes the spill table entry pointer to the hash table entry. For example, the location in the spill table memory 1304 where the new spill table entry was written may be saved as a spill index field of the hash table entry. Additionally, the computing device 1200 sets the spill valid bit in the hash table entry. After setting the spill bit, the method 1600 advances to block 1616.

Referring back to block 1606, if the hash table entry is not full, the method 1600 also advances to block 1616. In block 1616, the computing device 1200 inserts a pointer to position p in the hash table entry. For example, pointer field 0 of the hash table entry may be written with the value of the new byte position, and the existing pointers of the hash table entry may be shifted to other fields in the hash table entry.

In block 1618, the computing device 1200 increments the position p (e.g., to a new position p+1). In block 1620, the computing device 1200 determines whether p is beyond a pre-advance limit that is past the current input position. For example, in the illustrative embodiment, the computing device 1200 may determine whether the position p is more than 192 bytes beyond the current position in the input data. In block 1622, if it is determined that the position p is not past the pre-advance limit, the method 1600 loops back to block 1602 to continue indexing additional positions in the input data.

Referring back to block 1622, if it is determined that the position p is past the pre-advance limit, the computing device 1200 advances to block 1624, in which the computing device 1200 stalls the table updater 1306 until current input position is advanced. Because the table updater 1306 stalls if the position p advances beyond the pre-advance limit, the data in the index table (e.g., the hash table memory 1302 and the spill table memory 1304) may accordingly never be updated with pointers for positions beyond the pre-advance limit. The current input position is advanced when the search engine 1310 completes a search at the current position as described above in connection with block 1412 of FIG. 14. After the current input position is advanced, the method 1600 loops back to block 1602 to continue indexing additional positions in the input data.

EXAMPLES

Illustrative examples of the technologies disclosed herein are provided below. An embodiment of the technologies may include any one or more, and any combination of, the examples described below.

Example 1 includes a compute device to generate deterministic compressed streams, the compute device comprising: a compare engine to: receive a current string to be matched to one or more prior instances of the current string, the current string located within an input buffer and the one or more prior instances located within a history buffer; identify a limited subset of an index memory of the compare engine designated for storing pointers to the one or more prior instances, wherein to identify the limited subset is to identify a reserved slop region in the index memory; and compare the current string to at least one prior instance of the one or more prior instances, wherein to compare the current string is to locate the at least one prior instance using at least one pointer to the at least one prior instance, wherein the at least one pointer is stored within the limited subset of the index memory, and wherein to compare the current string is further to prohibit use of any pointers stored in the reserved slop region of the index memory.

Example 2 includes the subject matter of Example 1, wherein the compare engine comprises a hardware accelerator.

Example 3 includes the subject matter of any of Examples 1 and 2, wherein to compare the current string comprises to traverse in an order that is a reverse of an initialization order and to stop the traverse in response to entering the reserved slop region.

Example 4 includes the subject matter of any of Examples 1-3, further comprising a table updater to index the input buffer at positions from the current string up to a pre-advance limit, wherein the reserved slop region has a length determined as a function of to the pre-advance limit.

Example 5 includes the subject matter of any of Examples 1-4, wherein the length of the reserved slop region equals one pointer for each position of the pre-advance limit.

Example 6 includes the subject matter of any of Examples 1-5, wherein the compare engine is further to compare a plurality of instances and retire the comparisons in a natural order.

Example 7 includes the subject matter of any of Examples 1-6, wherein the natural order is a function of an input byte order.

Example 8 includes the subject matter of any of Examples 1-7, wherein the natural order is further a function of one or more heuristic matching rules.

Example 9 includes the subject matter of any of Examples 1-8, further comprising a table updater to generate a hash of an n-byte prefix string of the current string.

Example 10 includes the subject matter of any of Examples 1-9, wherein the table updater is further to: look up a hash table entry in a hash table using the hash, wherein the hash table entry holds one or more pointers to the one or more prior instances; determine whether the hash table entry is full; and write the hash table entry to a spill table in response to a determination that the hash table entry is full.

Example 11 includes the subject matter of any of Examples 1-10, wherein the table updater is to overwrite an oldest spill table entry in the spill table using the hash table entry.

Example 12 includes a method for data compression, the method comprising: receiving, by a compare engine of a computing device, a current string to be matched to one or more prior instances of the current string, the current string located within an input buffer and the one or more prior instances located within a history buffer; identifying, by the compare engine, a limited subset of an index memory of the compare engine designated for storing pointers to the one or more prior instances, further comprising identifying a reserved slop region in the index memory; and comparing, by the compare engine, the current string to at least one prior instance of the one or more prior instances, wherein comparing the current string further comprises locating the at least one prior instance using at least one pointer to the at least one prior instance, wherein the at least one pointer is stored within the limited subset of the index memory, and wherein comparing the current string includes prohibiting use of any pointers stored in the reserved slop region of the index memory.

Example 13 includes the subject matter of Example 12, and wherein the compare engine comprises a hardware accelerator.

Example 14 includes the subject matter of any of Examples 12 and 13, and wherein comparing the current string comprises traversing in an order that is a reverse of an initialization order and stopping the traverse in response to entering the reserved slop region.

Example 15 includes the subject matter of any of Examples 12-14, and further comprising indexing, by the computing device, the input buffer at positions from the current string up to a pre-advance limit, wherein the reserved slop region has a length determined as a function of to the pre-advance limit.

Example 16 includes the subject matter of any of Examples 12-15, and wherein the length of the reserved slop region equals one pointer for each position of the pre-advance limit.

Example 17 includes the subject matter of any of Examples 12-16, and wherein comparing the current string to the at least one prior instance comprises comparing the current string to a plurality of instances, the method further comprising retiring, by the compare engine, the plurality of comparisons in a natural order.

Example 18 includes the subject matter of any of Examples 12-17, and wherein the natural order is a function of an input byte order.

Example 19 includes the subject matter of any of Examples 12-18, and wherein the natural order is further a function of one or more heuristic matching rules.

Example 20 includes the subject matter of any of Examples 12-19, and further comprising generating, by a table updater of the computing device, a hash of an n-byte prefix string of the current string.

Example 21 includes the subject matter of any of Examples 12-20, and further comprising: looking up, by the table updater, a hash table entry in a hash table using the hash, wherein the hash table entry holds one or more pointers to the one or more prior instances; determining, by the table updater, whether the hash table entry is full; and writing, by the table updater, the hash table entry to a spill table in response to determining that the hash table entry is full.

Example 22 includes the subject matter of any of Examples 12-21, and further comprising overwriting, by the table updater, an oldest spill table entry in the spill table using the hash table entry.

Example 23 includes a computing device comprising: a processor; and a memory having stored therein a plurality of instructions that when executed by the processor cause the computing device to perform the method of any of Examples 12-22.

Example 24 includes one or more non-transitory, computer readable storage media comprising a plurality of instructions stored thereon that in response to being executed result in a computing device performing the method of any of Examples 12-22.

Example 25 includes a computing device comprising means for performing the method of any of Examples 12-22.

Example 26 includes a computing device for data compression, the computing device comprising: means for receiving, by a compare engine of the computing device, a current string to be matched to one or more prior instances of the current string, the current string located within an input buffer and the one or more prior instances located within a history buffer; means for identifying, by the compare engine, a limited subset of an index memory of the compare engine designated for storing pointers to the one or more prior instances, further comprising identifying a reserved slop region in the index memory; and means for comparing, by the compare engine, the current string to at least one prior instance of the one or more prior instances, wherein comparing the current string further comprises locating the at least one prior instance using at least one pointer to the at least one prior instance, wherein the at least one pointer is stored within the limited subset of the index memory, and wherein comparing the current string includes prohibiting use of any pointers stored in the reserved slop region of the index memory.

Example 27 includes the subject matter of Example 26, and wherein the compare engine comprises a hardware accelerator.

Example 28 includes the subject matter of any of Examples 26 and 27, and wherein the means for comparing the current string comprises means for traversing in an order that is a reverse of an initialization order and stopping the traverse in response to entering the reserved slop region.

Example 29 includes the subject matter of any of Examples 26-28, and further comprising means for indexing, by the computing device, the input buffer at positions from the current string up to a pre-advance limit, wherein the reserved slop region has a length determined as a function of to the pre-advance limit.

Example 30 includes the subject matter of any of Examples 26-29, and wherein the length of the reserved slop region equals one pointer for each position of the pre-advance limit.

Example 31 includes the subject matter of any of Examples 26-30, and wherein the means for comparing the current string to the at least one prior instance comprises means for comparing the current string to a plurality of instances, the computing device further comprising means for retiring, by the compare engine, the plurality of comparisons in a natural order.

Example 32 includes the subject matter of any of Examples 26-31, and wherein the natural order is a function of an input byte order.

Example 33 includes the subject matter of any of Examples 26-32, and wherein the natural order is further a function of one or more heuristic matching rules.

Example 34 includes the subject matter of any of Examples 26-33, and further comprising means for generating, by a table updater of the computing device, a hash of an n-byte prefix string of the current string.

Example 35 includes the subject matter of any of Examples 26-34, and further comprising: means for looking up, by the table updater, a hash table entry in a hash table using the hash, wherein the hash table entry holds one or more pointers to the one or more prior instances; means for determining, by the table updater, whether the hash table entry is full; and means for writing, by the table updater, the hash table entry to a spill table in response to determining that the hash table entry is full.

Example 36 includes the subject matter of any of Examples 26-35, and further comprising means for overwriting, by the table updater, an oldest spill table entry in the spill table using the hash table entry.

The invention claimed is:

1. A compute device to generate deterministic compressed streams, the compute device comprising:
   a compare engine to:
      receive a current string to be matched to one or more prior instances of the current string, the current string located within an input buffer and the one or more prior instances located within a history buffer;
      identify a limited subset of an index memory of the compare engine designated for storing pointers to the one or more prior instances, wherein to identify the limited subset is to identify a reserved slop region in the index memory; and
      compare the current string to at least one prior instance of the one or more prior instances, wherein to compare the current string is to locate the at least one prior instance using at least one pointer to the at least one prior instance, wherein the at least one pointer is stored within the limited subset of the index memory, and wherein to compare the current string is further to prohibit use of any pointers stored in the reserved slop region of the index memory.

2. The compute device of claim 1, wherein the compare engine comprises a hardware accelerator.

3. The compute device of claim 1, wherein to compare the current string comprises to traverse in an order that is a reverse of an initialization order and to stop the traverse in response to entering the reserved slop region.

4. The compute device of claim 1, further comprising a table updater to index the input buffer at positions from the current string up to a pre-advance limit, wherein the reserved slop region has a length determined as a function of to the pre-advance limit.

5. The compute device of claim 4, wherein the length of the reserved slop region equals one pointer for each position of the pre-advance limit.

6. The compute device of claim 1, wherein the compare engine is further to compare a plurality of instances and retire the comparisons in a natural order.

7. The compute device of claim 6, wherein the natural order is a function of an input byte order.

8. The compute device of claim 6, wherein the natural order is further a function of one or more heuristic matching rules.

9. The compute device of claim 1, further comprising a table updater to generate a hash of an n-byte prefix string of the current string.

10. The compute device of claim 9, wherein the table updater is further to:
look up a hash table entry in a hash table using the hash, wherein the hash table entry holds one or more pointers to the one or more prior instances;
determine whether the hash table entry is full; and
write the hash table entry to a spill table in response to a determination that the hash table entry is full.

11. The compute device of claim 10, wherein the table updater is to overwrite an oldest spill table entry in the spill table using the hash table entry.

12. A method for data compression, the method comprising:
receiving, by a compare engine of a computing device, a current string to be matched to one or more prior instances of the current string, the current string located within an input buffer and the one or more prior instances located within a history buffer;
identifying, by the compare engine, a limited subset of an index memory of the compare engine designated for storing pointers to the one or more prior instances, further comprising identifying a reserved slop region in the index memory; and
comparing, by the compare engine, the current string to at least one prior instance of the one or more prior instances, wherein comparing the current string further comprises locating the at least one prior instance using at least one pointer to the at least one prior instance, wherein the at least one pointer is stored within the limited subset of the index memory, and wherein comparing the current string includes prohibiting use of any pointers stored in the reserved slop region of the index memory.

13. The method of claim 12, wherein the compare engine comprises a hardware accelerator.

14. The method of claim 12, wherein comparing the current string comprises traversing in an order that is a reverse of an initialization order and stopping the traverse in response to entering the reserved slop region.

15. The method of claim 12, further comprising indexing, by the computing device, the input buffer at positions from the current string up to a pre-advance limit, wherein the reserved slop region has a length determined as a function of to the pre-advance limit.

16. The method of claim 15, wherein the length of the reserved slop region equals one pointer for each position of the pre-advance limit.

17. The method of claim 12, wherein comparing the current string to the at least one prior instance comprises comparing the current string to a plurality of instances, the method further comprising retiring, by the compare engine, the plurality of comparisons in a natural order.

18. The method of claim 12, further comprising generating, by a table updater of the computing device, a hash of an n-byte prefix string of the current string.

19. One or more non-transitory computer-readable storage media comprising a plurality of instructions stored thereon that, when executed by a computing device cause the computing device to:
receive, by a compare engine of the computing device, a current string to be matched to one or more prior instances of the current string, the current string located within an input buffer and the one or more prior instances located within a history buffer;
identify, by the compare engine, a limited subset of an index memory of the compare engine designated for storing pointers to the one or more prior instances, further comprising identifying a reserved slop region in the index memory; and
compare, by the compare engine, the current string to at least one prior instance of the one or more prior instances, wherein comparing the current string further comprises locating the at least one prior instance using at least one pointer to the at least one prior instance, wherein the at least one pointer is stored within the limited subset of the index memory, and wherein comparing the current string includes prohibiting use of any pointers stored in the reserved slop region of the index memory.

20. The one or more computer-readable storage media of claim 19, wherein the compare engine comprises a hardware accelerator.

21. The one or more computer-readable storage media of claim 19, wherein to compare the current string comprises traversing in an order that is a reverse of an initialization order and to stop the traverse in response to entering the reserved slop region.

22. The one or more computer-readable storage media of claim 19, further comprising a plurality of instructions stored thereon that, when executed by the computing device cause the computing device to index the input buffer at positions from the current string up to a pre-advance limit, wherein the reserved slop region has a length determined as a function of to the pre-advance limit.

23. The one or more computer-readable storage media of claim 22, wherein the length of the reserved slop region equals one pointer for each position of the pre-advance limit.

24. The one or more computer-readable storage media of claim 19, wherein to compare the current string to the at least one prior instance comprises to compare the current string to a plurality of instances, the computer-readable storage media further comprising a plurality of instructions stored thereon that, when executed by the computing device cause the computing device to retire, by the compare engine, the plurality of comparisons in a natural order.

25. The one or more computer-readable storage media of claim 19, further comprising a plurality of instructions stored thereon that, when executed by the computing device cause the computing device to generate, by a table updater of the computing device, a hash of an n-byte prefix string of the current string.

* * * * *